April 6, 1965    J. W. MONTGOMERY    3,176,873
ROPE CATCH AND BUCKET EAR FOR FRUIT PICKER'S BUCKET
Filed June 20, 1962

INVENTOR.
James W. Montgomery
BY
Fred C. Matheny
ATTORNEY

3,176,873
ROPE CATCH AND BUCKET EAR FOR FRUIT PICKER'S BUCKET
James W. Montgomery, Box 24, Orondo, Wash.
Filed June 20, 1962, Ser. No. 203,916
1 Claim. (Cl. 220—91)

My invention relates to a combined rope catch and bucket ear for a fruit picker's bucket.

A general object of my invention is to provide simple, convenient and time saving means for connecting a harness of the type ordinarily worn by a fruit picker with a bucket used to receive the picked fruit in such a manner as to avoid damaging the fruit.

In picking fruit, such for instance as peaches, it is common practice for the fruit pickers to use a receptacle, herein termed a bucket, to receive the fruit and to support this bucket from a harness which fits over the shoulders of the picker. Usually a bucket of this type has holes in its side walls near the top of the bucket and usually the harness has appendages provided with snaps which can be engaged within these holes. The use of snaps in this way is objectionable, particularly where easily damaged fruits are being handled, because parts of the snaps extend into the bucket and will often contact and damage the fruit.

An object of my invention is to prevent damage to fruit in a bucket in which it is placed at the time of picking by providing on the outside of the bucket near but below the top edge of the same efficient rope catch devices with which knotted ropes appended to a fruit picker's harness can be quickly and easily engaged and disengaged without danger of bruising, cutting or in any way damaging fruit in the bucket by bringing any parts of the harness or the catch devices into contact with the fruit.

Another object is to provide a bucket attachment having a catch member with which a rope can be quickly and easily engaged and disengaged manually and which will hold the rope securely so that it will not be accidentally released when the device is in use.

Another object is to provide a simple and efficient attachment for the exterior of a fruit picker's bucket, which attachment has both a catch for engagement with knotted ropes on a fruit picker's harness by which the bucket may be supported while picking and an ear to which a bucket bail may be secured in such a manner that the bail can not contact or injure fruit in the bucket and in which neither the bail or the bucket ear will be in the way if the bucket, when empty, is inverted and placed on a flat support, such as a floor or table.

Another object is to provide a combined rope catch and bucket ear of this type in which the bucket bail can be supported on the rope catch in a position in which it is convenient to take hold of if the bucket is resting on a floor and no ropes are engaged in the rope catch.

Other objects of my invention will be apparent from the following description taken in connection with the accompanying drawings.

In the drawings FIGURE 1 is a side elevational view of a fruit picker's bucket having my harness or rope catch and bucket ear thereon and showing a fragment of a knotted rope engaged with the rope catch.

Like reference numerals refer to like parts throughout the several views.

Figure 1:
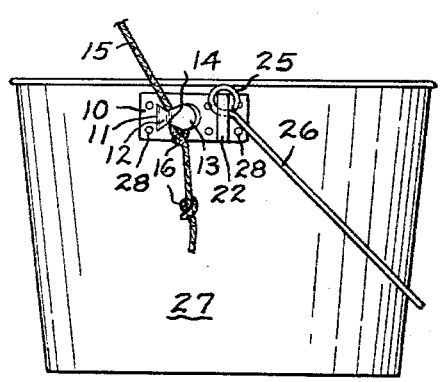

The harness catch and bucket ear of my invention comprises a rectangular plate 10 of fairly strong sheet metal having a longitudinal curvature which adapts it to fit the curvature of a conventional fruit picker's bucket, said plate having a catch member, of suitable shape to receive and hold a knotted rope, displaced from or punched out of it and further having a bail receiving ear formed in it by bending. Suitable perforations 9 are formed in the plate 10 to receive rivets.

The rope catch comprises a base part or bend 11 rigid with the plate 10, a rear part 12 rigid with and extending outwardly from the base 11 at a substantial angle to the plate 10 and a terminal part 13 integral with the rear part 12 and spaced a substantial distance outwardly from the plate 10 and slightly inclined away from the plate 10. Preferably the forward end of the terminal part 13, that is the end shown at the right in the drawings, is rounded. Both parts 12 and 13 converge toward the location where they join with each other and by so doing they provide on each side of the rope catch a depression or indentation 14 within which a knot 16 in a rope 15 may seat, as shown in FIG. 1.

The curved forward end of the terminal part 13 is spaced outwardly from the plate 10 far enough so that a rope 15 of predetermined diameter can be easily engaged under it. Said terminal part 13 is slightly inclined toward the plate 10 from its forward end to the location where it merges with the rear part 12 so that there is only enough room between the rear end of the part 13 and the plate 10 to draw a rope 15 of predetermined diameter into and so that the rope will fit snugly and will not be accidentally disengaged but is easily released manually and so that the knot 16 in the rope can not pass under the part 13 but will be drawn snugly into the lowermost indentation 14.

The bail receiving ear is preferably in the form of a transversely extending outwardly protruding loop of U-shaped cross section formed in the plate 10 in spaced relation from the forward end portion of the catch part 13. This ear is formed by suitably bending the plate 10 to provide two spaced apart side walls 20 and 21 which are connected at their outer edges by a rounded part 22. The side walls 20 and 21 are each provided with two vertically aligned elongated perforations or slots 23 and 24 within which a ring 25 on the end of a bail 26 may be engaged. The provision of two slots 23 and 24 in each of the side walls 20 and 21 and the provision of an indentation 14 on each side of the rope catch makes this device reversible so it can be applied to either side of a bucket 27.

Figure 2:
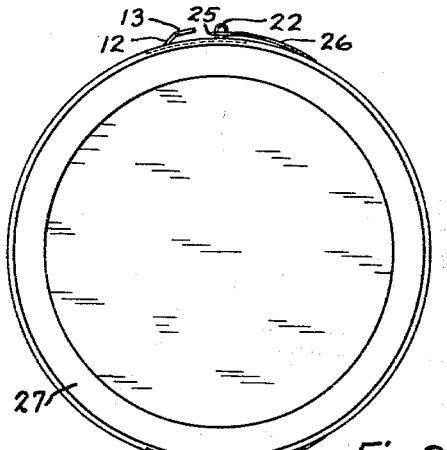
FIG. 2 is a top plan view of the bucket shown in FIG. 1, the rope being omitted.
Figure 3:
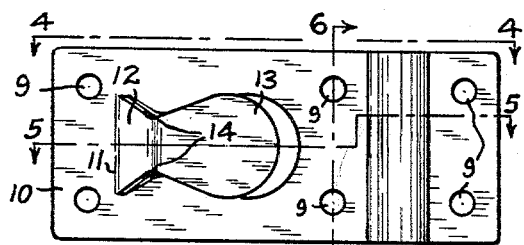
FIG. 3 is a detached view in elevation, on a larger scale than FIGS. 1 and 2, of one of my harness catch and bucket ear devices.
Figure 6:
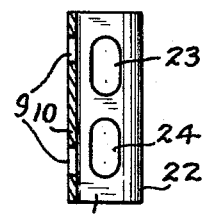
FIG. 6 is a sectional view, with parts in elevation, taken on broken line 6—6 of FIG. 3.
Figure 4:
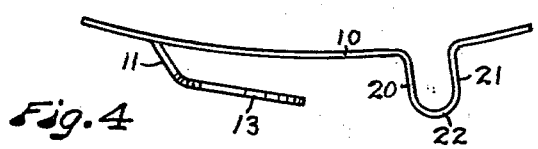
FIG. 4 is an edge view looking in the direction of broken line 4—4 of FIG. 3.
Figure 5:
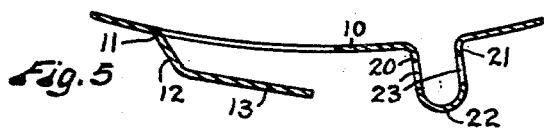
FIG. 5 is a sectional view taken substantially on broken line 5—5 of FIG. 3.
Figure 7:
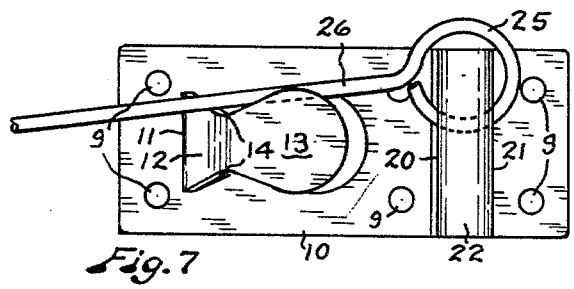
FIG. 7 is a view similar to FIG. 3 showing a bucket bail connected with a bucket ear of my device with the bail resting on the harness or rope catch in a position where it may easily be grasped in picking up the bucket.

In the application of this device to a bucket 27 two of the plates 10 are secured in opposed relation to the exterior of the bucket 27 near the top thereof by rivets 28, FIG. 1. The rings 25 on the ends of a bail 26 are engaged with the slots 23 or 24 which are uppermost in the walls 20 and 21 of the bucket ear. The rings 25 do not extend above the top edge of the bucket and will not contact and injure fruit which may, at times, be heaped above the level of the top of the bucket. The plates 10 shown in FIGS. 1 and 2 are positioned on the bucket 27 so that the bucket ears are diametrically opposite and the bucket will be balanced when it is supported by the bail 26. Obviously the positioning of these plates 10 on the bucket 27 can be varied as desired. The catch 12, 13 can be used as a bail rest to support the bail 26 in the elevated and approximately horizontal position in which it is shown in FIG. 7 so that the bail can be grasped easily and without much stooping when the bucket is upright on a horizontal support, such as a floor.

Figure 8:
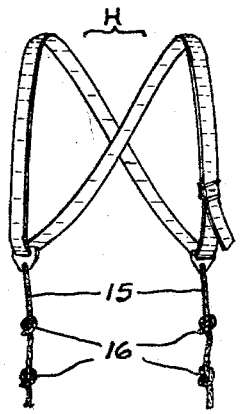
FIG. 8 is an elevational view of a fruit picker's harness having knotted ropes attached thereto for engagement with rope catches on a bucket equipped with my invention.

When the bucket 27 is being used in picking fruit the fruit picker using it will ordinarily wear a harness H, FIG. 8, which fits over his shoulders and is provided with two depending ropes 15 having knots 16 therein. The picker using this device can quickly and easily engage the knotted ropes 15 with the catch member 12, 13 at the two sides of the bucket so that the bucket will be supported from the shoulders of the picker and may rest against his body. The ropes 15 fit snugly under the catch part 13 and the knots 16 are drawn into the depressions or indentations 14 so that there is not any danger that they will be accidentally released from the catch member even if the picker rests the bucket on a tree branch or like support and lets the ropes become slack. The position of the knots 16 in the ropes 15 can easily be changed by the picker to adjust the position of the bucket 27 relative to his body. Although the ropes 15 are held securely when engaged under the catch member 13 they are very quickly and easily released manually at any time.

The foregoing description and accompanying drawings clearly disclose a preferred embodiment of my invention but it will be understood that this disclosure is merely illustrative and that changes may be made within the scope of the following claim.

I claim:

The combination with a fruit picker's bucket of a rectangular metal plate attached to the outer side of said bucket close to but entirely below the top of the bucket with its longest dimension parallel with the plane of the top of the bucket; a rope catch member displaced from and extending generally longitudinally of said metal plate, said rope catch member comprising a base part integral with and curving away from said plate, an inclined outwardly extending convergent part integral with said curved base part, and a flat terminal part integral with said outwardly extending part, the forward end portion of said flat terminal part being of rounded outline, said flat terminal part and said outwardly extending part being of narrower width at the location where they join and of increasing width in both directions from said joined location providing a knot receiving indentations on each edge of said rope catch member at the said joined location and making said plate reversible, whereby two of said plates can be applied to opposite sides of a bucket with their rope catch members pointing in the same direction, said flat terminal part being slightly inclined away from said plate toward its forward end and being capable of receiving thereunder and holding a knotted supporting rope with the rope fitting snugly between the rope catch member and the plate and a knot in the rope engaged within the indentation in the lower edge of the rope catch member; an integrally formed bail receiving ear of U-shaped cross section extending outwardly from and vertically across said metal plate adjacent to but spaced from the tip end of the flat terminal part of said rope catch member, said ear having two pairs of vertically elongated slots therein with each pair of slots in approximately horizontal alignment with the adjacent edge of the catch member; and a bail having an end ring engaged within the uppermost pair of slots in the ear, whereby said bail can be positioned on and supported by said rope catch member below but approximately parallel with the plane of the top of the bucket.

References Cited in the file of this patent

UNITED STATES PATENTS

| | | |
|---|---|---|
| 179,353 | Saulson | June 27, 1876 |
| 485,011 | Kneeland | Oct. 25, 1892 |
| 669,533 | Lowe | Mar. 12, 1901 |
| 817,575 | Lowe | Apr. 10, 1906 |
| 888,519 | Martindale | May 26, 1908 |
| 1,072,556 | Wood | Sept. 9, 1913 |
| 1,094,262 | Spangenberg | Apr. 21, 1914 |
| 2,233,843 | McClaskey | Mar. 4, 1941 |
| 2,229,471 | Powers | Jan. 21, 1941 |